(12) United States Patent
Stelter (10) Patent No.: US 8,180,267 B2
(45) Date of Patent: May 15, 2012

(54) ELECTROPHOTOGRAPHICALLY PRODUCED BARRIER IMAGES USING AN INTERMEDIATE TRANSFER MEMBER

(75) Inventor: Eric C. Stelter, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 219 days.

(21) Appl. No.: 12/396,779

(22) Filed: Mar. 3, 2009

(65) Prior Publication Data

US 2010/0226692 A1   Sep. 9, 2010

(51) Int. Cl.
   *G03G 15/01* (2006.01)
   *G03G 15/08* (2006.01)
(52) U.S. Cl. .................................. 399/302; 399/223
(58) Field of Classification Search .................. 399/223, 399/298, 299, 381, 411, 302, 366; 355/22; 283/72, 94, 902
See application file for complete search history.

(56) References Cited

U.S. PATENT DOCUMENTS

| | | | |
|---|---|---|---|
| 3,161,509 A | 12/1964 | Howe et al. | |
| 5,178,928 A | 1/1993 | Goto et al. | |
| 5,260,753 A | 11/1993 | Haneda et al. | |
| 5,359,454 A * | 10/1994 | Steenblik et al. | 359/463 |
| 5,398,131 A * | 3/1995 | Hall et al. | 359/465 |
| 5,461,495 A * | 10/1995 | Steenblik et al. | 359/463 |
| 5,568,313 A * | 10/1996 | Steenblik et al. | 359/463 |
| 6,103,345 A | 8/2000 | Oshima et al. | |
| 6,464,348 B1 * | 10/2002 | Kasperchik et al. | 347/101 |
| 6,465,077 B1 | 10/2002 | Lee et al. | |
| 7,688,474 B2 * | 3/2010 | Wang | 358/3.28 |
| 7,699,350 B2 * | 4/2010 | Heim | 283/91 |
| 2006/0133870 A1 | 6/2006 | Ng et al. | |
| 2007/0273142 A1 * | 11/2007 | Tompkin et al. | 283/72 |
| 2008/0159786 A1 | 7/2008 | Tombs et al. | |
| 2008/0171144 A1 * | 7/2008 | Raksha et al. | 427/162 |
| 2009/0097114 A1 * | 4/2009 | Mimura et al. | 359/463 |
| 2010/0226693 A1 * | 9/2010 | Stelter | 399/299 |

FOREIGN PATENT DOCUMENTS

| | | | |
|---|---|---|---|
| DE | 10 2006 003 311 A | | 7/2007 |
| JP | 04033880 A | * | 2/1992 |
| JP | 07 244343 A | | 9/1995 |
| JP | 07244343 A | * | 9/1995 |
| JP | 11327065 A | * | 11/1999 |
| JP | 2002 072613 A | | 3/2002 |
| JP | 2004163797 A | * | 6/2004 |
| JP | 2005099822 A | * | 4/2005 |
| JP | 2007187768 A | * | 7/2007 |
| WO | WO 2006133512 A1 | * | 12/2006 |

OTHER PUBLICATIONS

I TechnologE Watch, vol. 11, Fall 2006.

* cited by examiner

Primary Examiner — Robert Beatty
(74) Attorney, Agent, or Firm — Donna P. Suchy (57) ABSTRACT

Systems and methods of producing image products using printing are provided. The printed image products can include stereoscopic and/or color shifting images. These images can be formed by a sequential application of a base image, a clear toner layer and a barrier image layer in a single pass through a printer. The barrier image layer can include opaque barriers (for stereoscopic or color shifting images) or can include translucent or transparent barriers (for color shifting images).

16 Claims, 11 Drawing Sheets

ELECTROPHOTOGRAPHICALLY PRODUCED BARRIER IMAGES USING AN INTERMEDIATE TRANSFER MEMBER

CROSS REFERENCE TO RELATED APPLICATIONS

This application relates to commonly assigned co-pending U.S. application Ser. No. 12/396,809 filed on Mar. 3, 2009, entitled: "ELECTROPHOTOGRAPHICALLY PRODUCED BARRIER IMAGES" in the name of Eric C. Stelter.

FIELD OF THE INVENTION

This invention relates in general to printing, and more particularly to producing image products that include barrier images using a single printing process.

BACKGROUND OF THE INVENTION

Figure 1A:
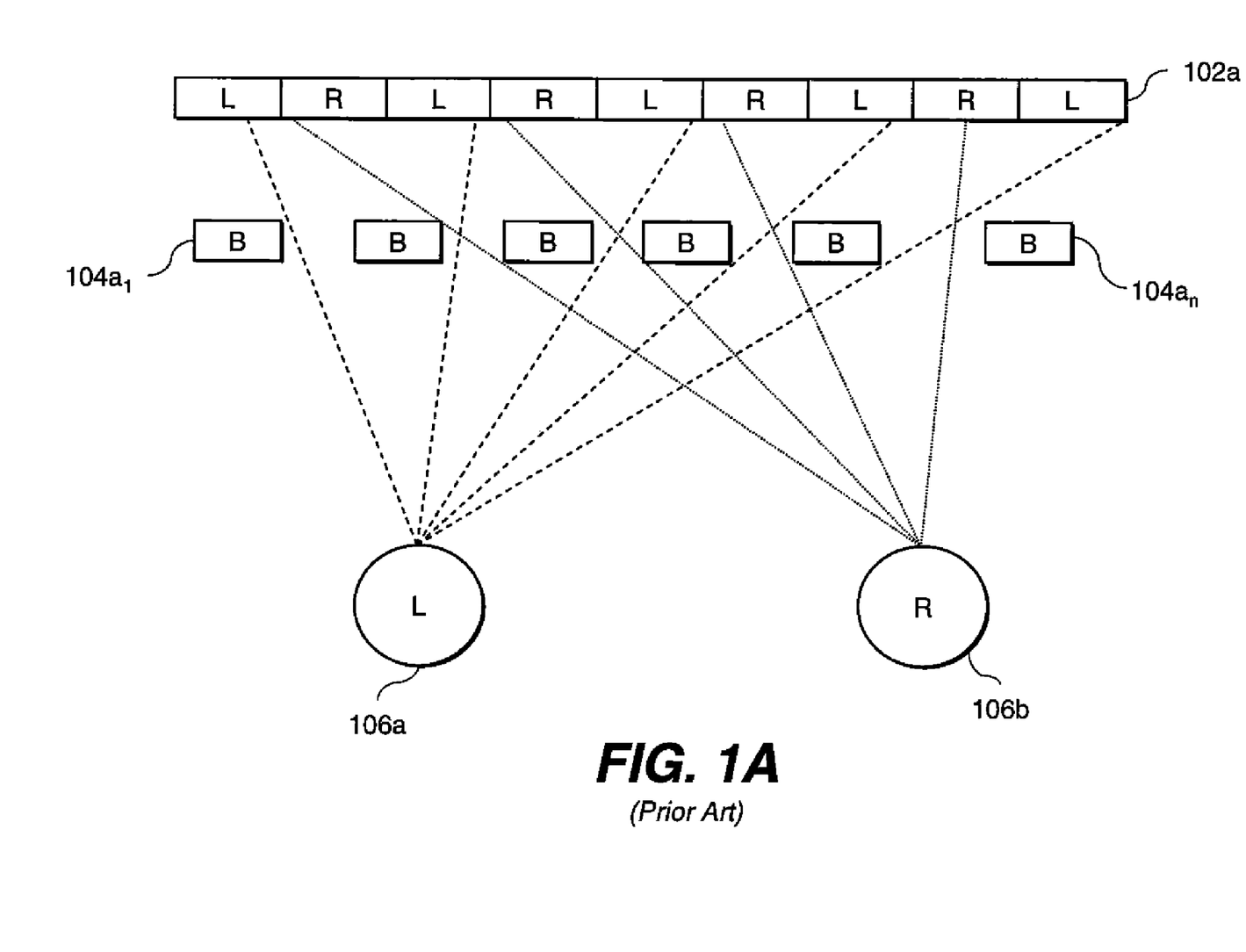
FIG. 1A is a schematic side view of a typical stereoscopic image reproduction technique using barriers.

Stereoscopic images provide a viewer with a three-dimensional image. One technique for producing stereoscopic images uses barriers. FIG. 1A is a schematic side view of a typical stereoscopic image reproduction technique using barriers. As illustrated in FIG. 1A, a base image 102a includes two interdigitated images, one designed for each of the viewers eyes (i.e., a left eye image and a right eye image). A set of barriers $104a_1$-$104a_n$ are arranged between the viewer and base image 102. Barriers $104a_1$-$104a_n$ are arranged such that a viewer's left eye (106a) views the left eye images (L) and a viewers right eye (106b) views the right eye images (R). By properly designing the interdigitated left and right eye images and proper placement of the barriers 104, a viewer will see a three-dimensional image.

Conventional techniques for producing barrier images suffer from a number of drawbacks. For example, because the base image is formed on a different side of the transparent substrate from that of the barriers, registration of the image and the barriers is difficult because the image product cannot be produced in a single pass through a printer without flipping the substrate over and reregistering the image.

SUMMARY OF THE INVENTION

This invention is directed to producing image products, including stereoscopic, motion, and color shifting image products, by electrographic techniques. The invention is also directed to apparatus for producing such image products and the resultant image products. An exemplary method comprises applying a base image to an image receiving surface. A clear toner is then applied on the base image, and a second toner is applied on the clear toner to form at least one barrier. The barrier can be arranged to form stereoscopic, motion or color shifting image products. The image receiving surface may be transparent, translucent, or reflective. The image can also be produced on a portion of a substrate that contains conventional color images and it can contain variable data that can correspond to variable data in the conventional image.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DETAILED DESCRIPTION OF THE INVENTION

Conventional techniques for producing barrier images suffer from a number of drawbacks. For example, because the base image is formed on a different side of the transparent substrate from that of the barriers, registration of the image and the barriers is difficult because the image product cannot be produced in a single pass through a printer without flipping the substrate over and reregistering the image. Additionally, because the base image is viewed from the opposite side of the transparent substrate from which is it applied, the image must be manipulated such that the applied base image is a mirror image of the viewed base image. If the applied image is printed on the side of the transparent substrate closest to the viewer, the separation transferred to the substrate will be a mirror image of the printed image. If the applied image is printed on the side of the transparent substrate farthest from the viewer, the separation transferred to the substrate will have the same parity as the image viewed through the substrate, and the separation will not be a mirror image.

The present invention is a method of producing an image product including applying a base image to an image receiving surface, applying a clear toner on the base image, and applying a second toner on the clear toner to form at least one barrier in various manners as discussed in detail below.

Figure 1B:
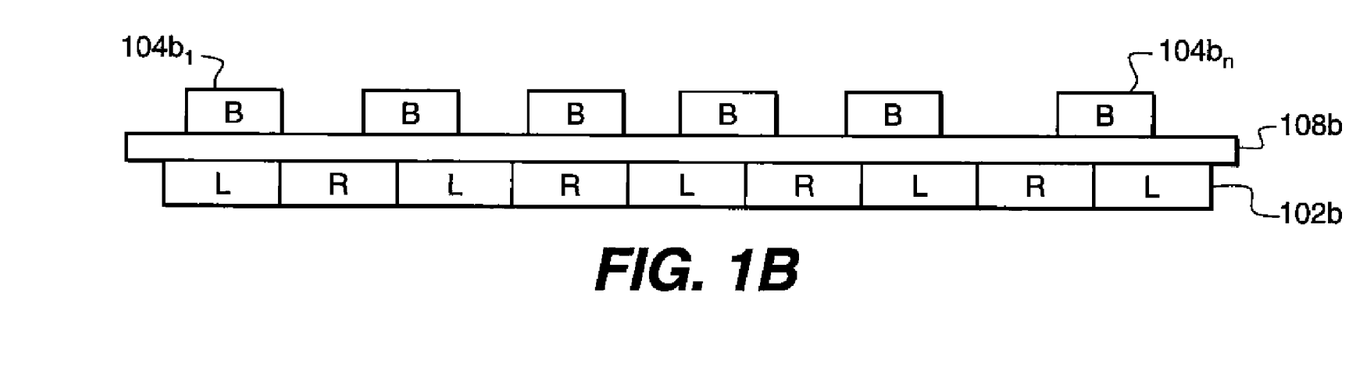
FIG. 1B is a schematic side view, in cross section of an improved image product.

FIG. 1B is a schematic side view, in cross section, of a stereoscopic image product using barriers. Generally, stereoscopic image products that use barriers to produce the stereoscopic images include a base image 102b formed on a backside of a transparent substrate 108b, and the barriers $104b_1$-$104b_n$ are printed on the front side of transparent substrate 108b. The backside of the stereoscopic image may be illuminated to increase the three-dimensional effect or the stereoscopic image can be laminated to another substrate. Other types of barrier images include motion images and color-shifting images. Barrier images can appear to move when the viewing angle is changed. These are referred to as motion images. It is possible to print barrier images that produce a color shift when the viewing angle is changed. These are referred to as color-shifting images.

Exemplary embodiments of the invention allow printing stereoscopic images, motion images or color-shifting images in a single pass through an electrographic printer. Specifically, referring now to FIG. 1C, in an embodiment, a receiver member 108c sequentially receives a base image 102c, a layer of clear toner 110c and a layer of barrier images $104c_1$-$104c_n$ to produce a stereoscopic image. The base image can be composed of combinations of three colors, such as yellow, magenta and cyan (YMC) or the base image can be composed of combinations of four colors, such as cyan, magenta, yellow, and black (CMYK). As used herein, the term base image broadly includes any type of image (e.g., logos, pictoral images), text and/or a combination of both. The barriers $104c_1$-$104c_n$ can be printed in recesses $105c_1$-$105c_i$-$105c_n$ in the layer of clear toner 110c as shown in FIG. 1C or they can be applied in relief to the outer surface of the layer of clear toner 110c, similar to the barriers in FIG. 1B.

Figure 1C:
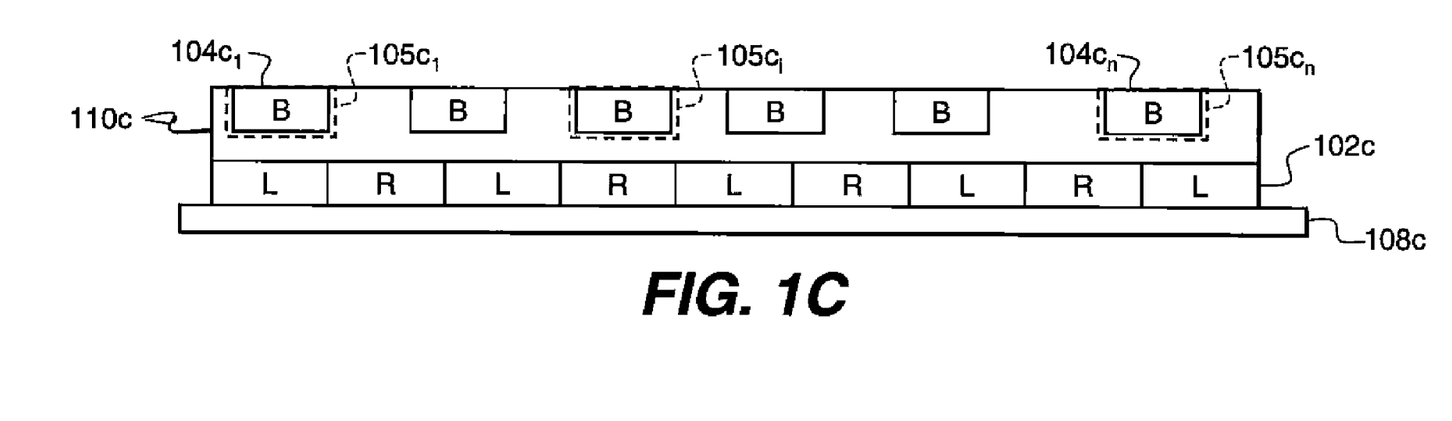
FIG. 1C is a schematic side view, in cross section of an improved stereoscopic image product formed in accordance with the present invention.

FIG. 1C is a schematic side view, in cross section of an improved stereoscopic image product formed in accordance with the present invention that can be printed on one side of a substrate and in which the barrier is recessed into the transparent layer to produce a smooth outer surface that results in a thinner transparent layer in those areas.

Figure 1D:
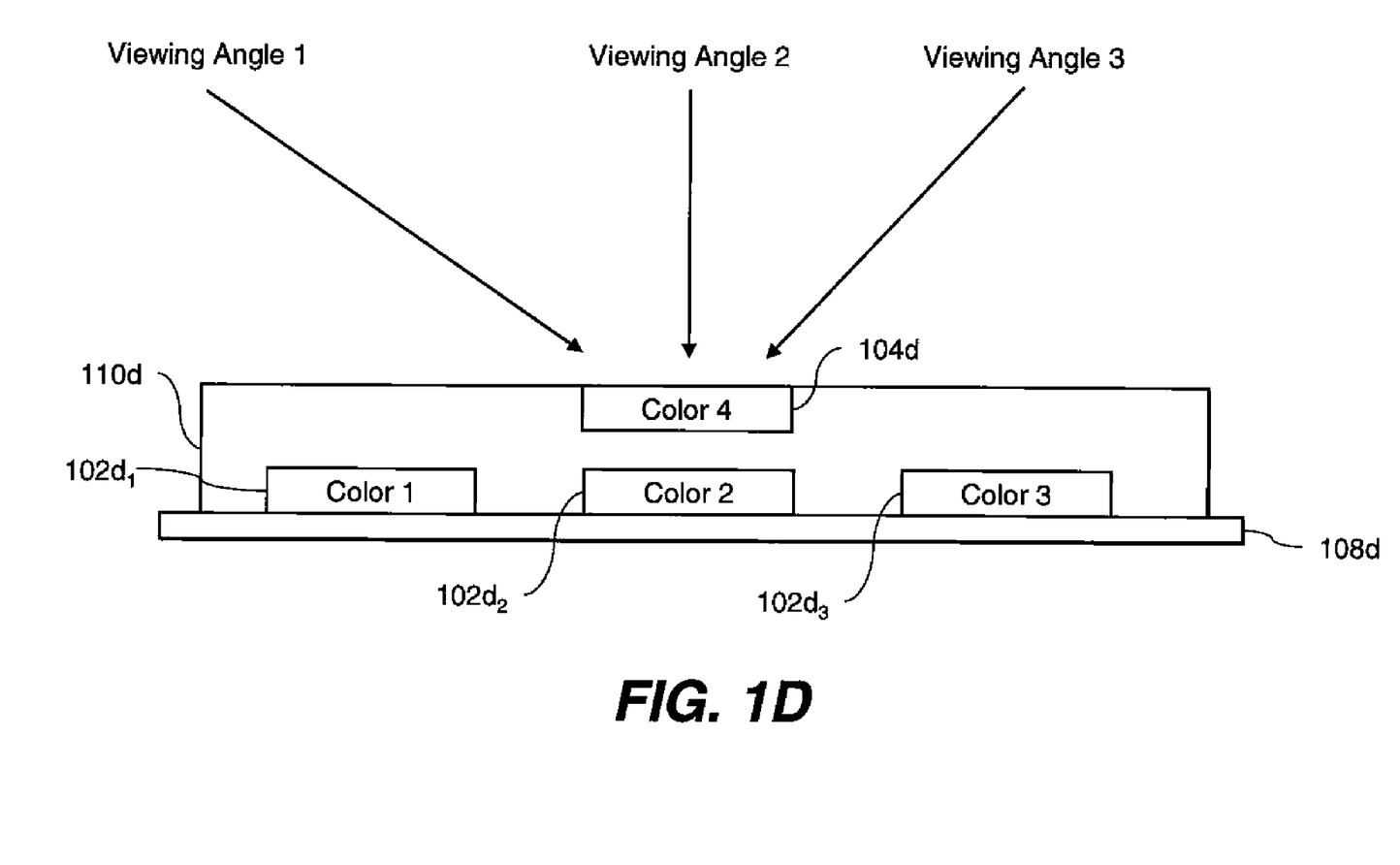
FIGS. 1D and 1E are schematic side views, in cross section of a color shifting image products formed in accordance with the present invention.
Figure 1E:
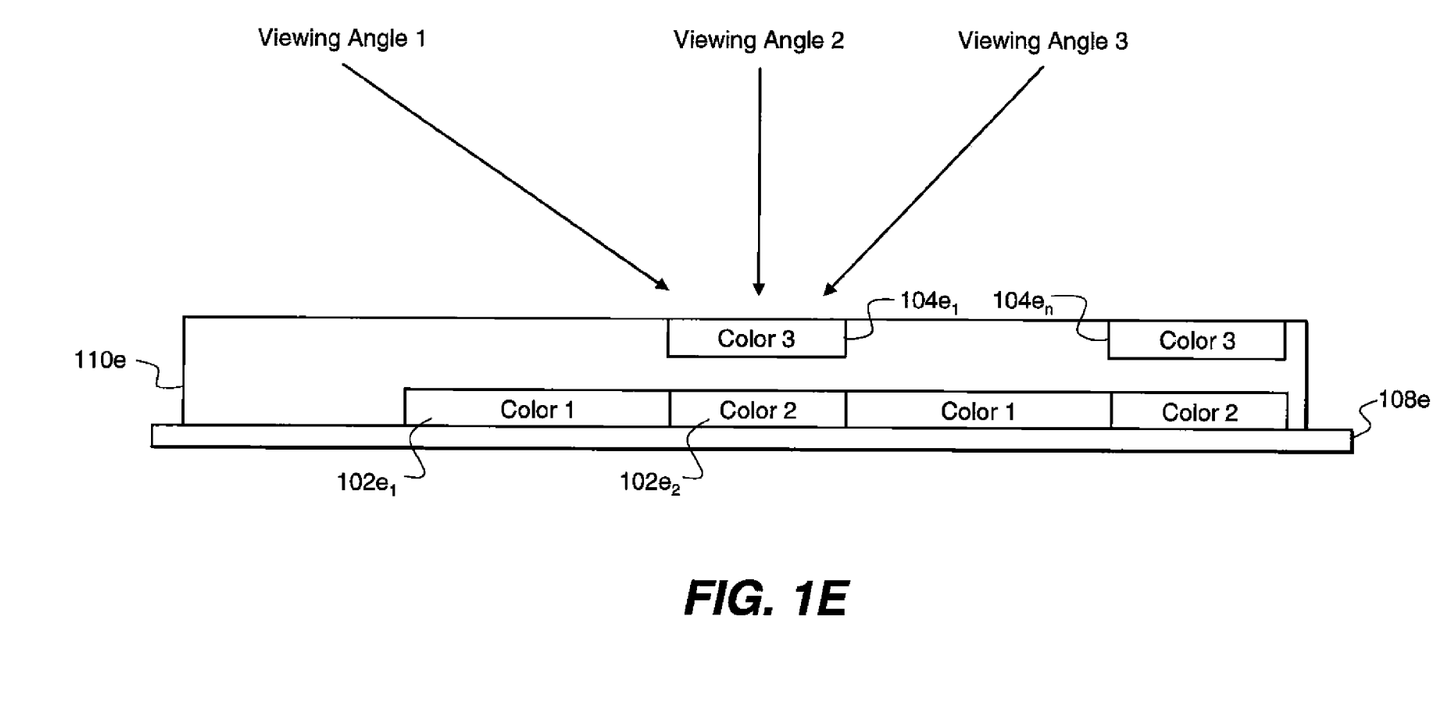

FIGS. 1D and 1E are schematic side views, in cross section of a color shifting image products formed in accordance with the present invention. The colors 1-4 shown could alternately be primary colors or composite colors made up of multiple primaries. Color-shifting images are illustrated in FIGS. 1D and 1E. Referring now to FIG. 1D, a base image of, for example, three different colors $102d_1$-$102d_3$ is initially formed on a receiver member 108d. Next a clear toner 110d is applied and finally an opaque color 104d is applied as a barrier.

When the image product of FIG. 1D is viewed from Viewing Angle 1, Color 1 $102d_1$ and Color 2 $102d_2$ are visible but Color 3 $102d_3$ is blocked by Color 4 104d, and is thus not visible (or less visible, depending upon the exact viewing angle). When the image product is viewed from Viewing Angle 2, Color 2 $102d_2$ is not visible because it is block by Color 4 104d, but Color 1 $102d_1$ and Color 3 $102d_3$ are visible. When the image product is viewed from Viewing Angle 3, Color 2 $102d_2$ and Color 3 $102d_3$ are visible but Color 1 $102d_1$ is blocked by Color 4 104d, and is thus not visible (or less visible, depending upon the exact viewing angle). For a color-shift image containing two interdigitated images, a complete color shift is observed when the viewing angle changes by an amount that changes the alignment of the barrier from one image to the other image. This viewing angle change is determined by the arctangent of the ratio of the width of the at least one barrier image, usually one pixel, to the thickness of the clear layer. However, a color shift will be visible for a change of approximately ¼ this angle, as shown in Table 2.

Referring now to FIG. 1E, a base image of, for example, two different colors $102e_1$ and $102e_2$ is initially formed on a receiver member 108d. Next a clear toner 110e is applied and finally a translucent or transparent color of barriers $104e_1$ and $104e_n$ is applied. Compared to the use of an opaque barrier in FIG. 1D, which provides color-shifting due to obscuring colors, the use of a translucent or transparent color barrier in FIG. 1E also provides color shifting in which a viewer sees subtractive colors based on a combination of the barrier color and the base image color.

Assume, for example, that in FIG. 1E Color 1 is magenta, color 2 is yellow and Color 3 is cyan. Accordingly, when viewed from Viewing Angle 1 or Viewing Angle 3, the image has a bluish tint due to the overlap of the cyan of Color 3 and the magenta of Color 1. When viewed from Viewing Angle 2, the image has a greenish tint due to the overlap of the cyan of Color 3 and the yellow of Color 2.

The color shifting images can be used in a variety of applications. For example, the color shifting images can be used for security imaging with moiré between the barrier and the underlying image by printing the outer separation at a different screen frequency from the underlying image. The underlying image 102e may also contain characters or other data with regions printed in one or more colors. The security imaging can be used in any type of application, such as currency to allow a background to change colors depending upon viewing angle, make portions of the image appear to move (i.e., a person winking), and/or the like. Additionally, the color shifting can be used for any type of element including, but not limited to, text, logos, pictoral images or any other normally halftoned element of an image.

It should be recognized that the arrangement of colors described above in connection with FIGS. 1C-1E is merely exemplary and that the colors can be provided in different arrangements, so long as the barriers are separated from the base image with a layer of clear toner. Furthermore, the particular shapes of the barriers are merely exemplary, and the barriers can take any number of different shapes including, but not limited to, strips, dots, arcs, triangles, square, text or pictographs. Additionally, the receiver member can be any type of product, including plain paper, clear substrates, reflective substrates (e.g., Mylar) and/or the like.

Figure 1F:
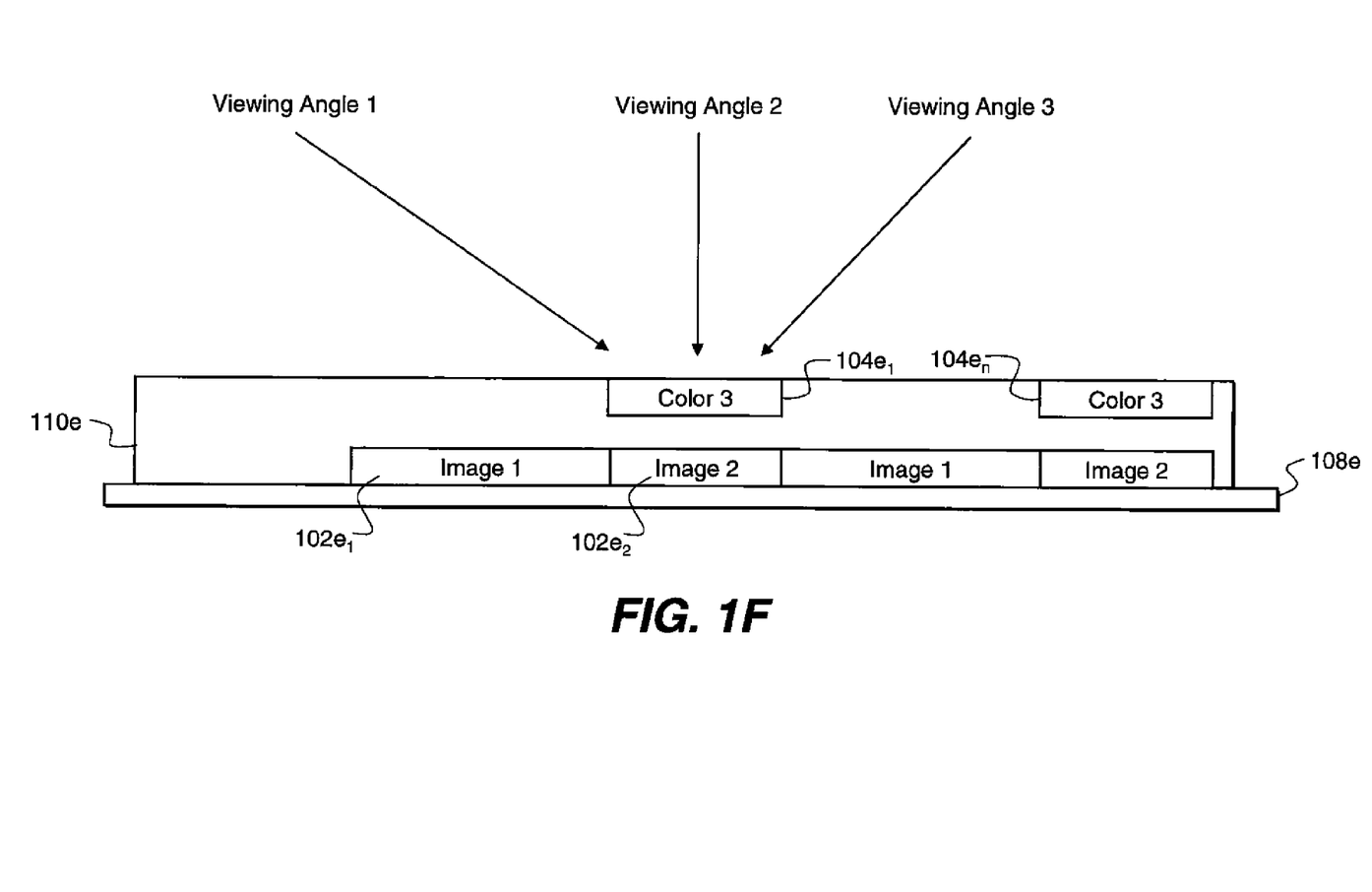
FIG. 1F is a schematic side view, in cross section of a motion image product formed in accordance with the present invention.

FIG. 1F shows an embodiment of barrier imaging that is used for motion images. Image 1 or image 2 is visible at different viewing angles. As the viewing angle of an observer changes, for example, by walking past the image, image 1 or image 2 is visible. The image that is not visible is obscured by the barrier. To prepare this embodiment, image 1 and image 2 are interdigitated. The thickness of the clear toner layer and the width of the barriers relative to each other are at a ratio, as shown in Table 2 below that allows the plurality of interdigitated images to be observable in series as a viewing angle of an observer changes, producing a moving image when observed by an observer that is in motion. For a motion image containing two interdigitated images, the viewing angle change to obscure one image and allow the other image to be viewed is determined by the arctangent of the ratio of the width of the at least one barrier image, usually one pixel, to the thickness of the clear layer.

For Example, barriers made from toner can be from 5 to 15 microns thick. In this example, barriers of 11 microns are contemplated. Clear toner layers of 17 to 20 microns thick and up to approximately 60 microns in thickness are used.

Assuming a viewing distance of 15 inches and a pupil-to-pupil spacing of 2.5 inches, a light ray entering each eye from a point on a substrate makes an angle of approximately 4.76 degrees from perpendicular. For stereoscopic images as shown in FIG. 1C, with the center of the barrier aligned with the edge of adjacent image pixels, (or offset by ½ the pitch of the image pixels) the thickness of the clear layer between the top of the barrier and the top of the image for common printer resolution in dots per inch (DPI) is given in TABLE 1.

TABLE 1

| Resolution (DPI) | Pixel width (microns) | Clear layer thickness (microns) |
|---|---|---|
| 600 | 42.3 | 254 |
| 1200 | 21.2 | 127 |
| 2400 | 10.6 | 63.5 |
| 4800 | 5.3 | 31.75 |

TABLE 2 shows for motion images and for color-shifting images the viewing angle for 60 micron and 18 micron thick transparent layers. Here the barrier is aligned with the pixels of the underlying images.

TABLE 2

| | Viewing angle change (degrees from normal) Transparent thickness ... | | | |
|---|---|---|---|---|
| dpi | 60 micron Barrier Image | 18 micron Barrier Image | 60 micron Color-shift Image | 18 micron Color-shift Image |
| 600 | 35.18384 | 66.9487 | 9.995722 | 30.43424 |
| 1200 | 19.46001 | 49.66686 | 5.048025 | 16.40677 |
| 2400 | 10.01887 | 30.49336 | 2.52892 | 8.37505 |
| 4800 | 5.048025 | 16.40677 | 1.265076 | 4.210013 |

Figure 2A:
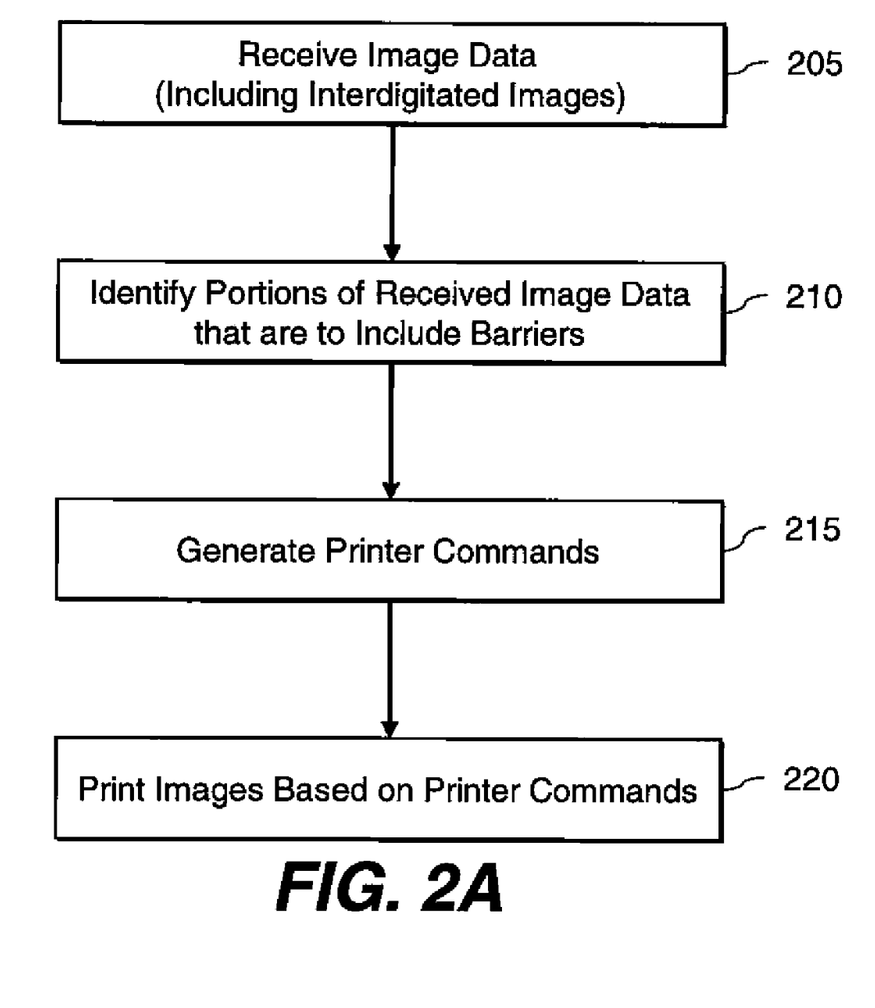
FIG. 2A is a flow chart illustrating an exemplary method in accordance with the present invention.

FIG. 2A is a flow chart illustrating an exemplary method in accordance with the present invention. Initially, image data is received (step 205) and portions of the received image data that are to include barriers are identified (step 210). For example, a letter, envelope or other printed product, can include portions that have stereoscopic or color-shifting images and portions that include regular images, and these different portions are identified for use in the printing process. Image commands are then generated based on the received image data and the portions that are to include stereoscopic or color-shifting images (step 215) and an image product is printed based on the printer commands (step 220). Steps 205-215 can be performed using a general purpose computer with a suitable printer driver and/or using specific purpose hardware and software (e.g., an application specific integrated circuit (ASIC) and/or a field programmable gate array (FPGA).

Figure 2B:
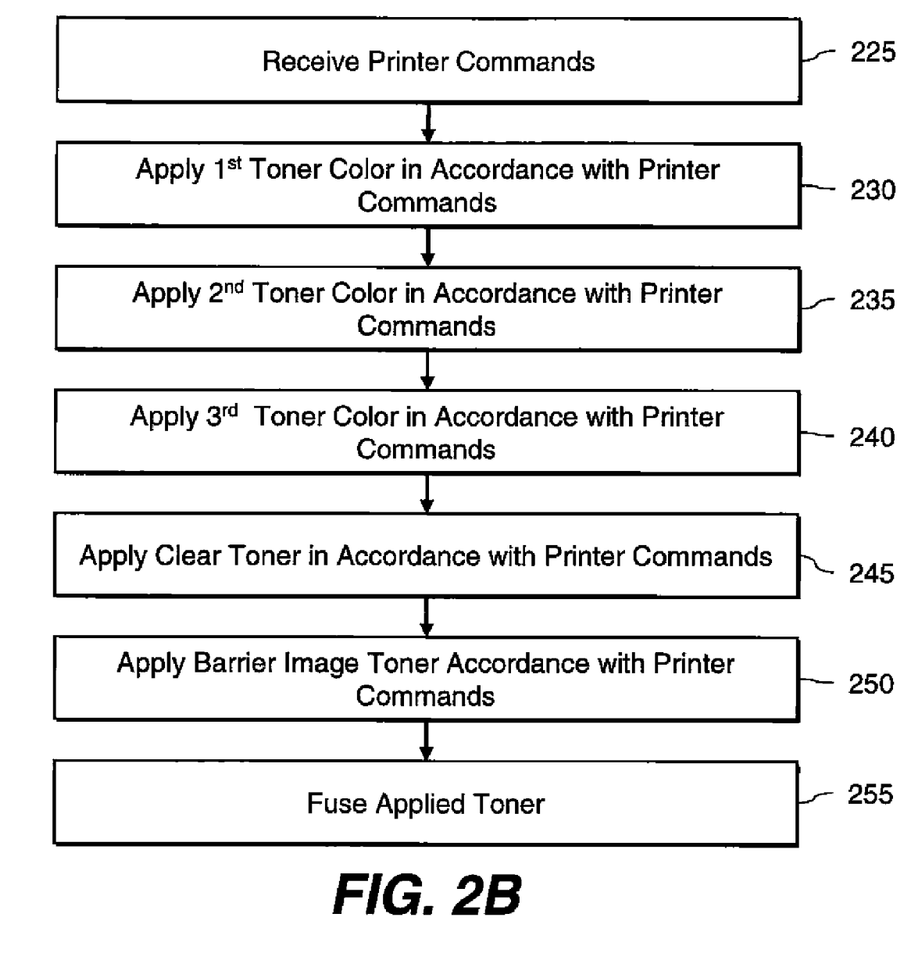
FIG. 2B is a flow chart illustrating another exemplary method in accordance with the present invention.

Step 220 is performed using a printer, and the printing process will be described in more detail in connection with FIG. 2B. Initially, the printing commands are received by the printer (step 225) and the first, second, third, and any additional toner colors are successively applied to a suitable receiver member in accordance with the printer commands (steps 230-240). Next, a clear toner is applied to the receiver member in accordance with the printer commands (step 245) in register with the previous images, and a barrier image toner is then applied to the receiver member in accordance with the printer commands (step 250) in register with the previous images. Preferably, the clear toner can be applied such that portions including barriers have less clear toner than portions that do not include barriers. This provides a smooth surface to the resultant image product. This is also an additional security feature that makes images less easily modified. This product is described in this embodiment as printed on a substrate or receiver but one skilled in the art understands that the invention could also be printed on a printer intermediate, such as a web and then transferred to a receiver. The print method could be performed in any order, including the one described and others described below, as is appropriate for the printing process used.

One embodiment of an alternate printing method uses an intermediate transfer surface, such as a web or roller, to collect the image before it is transferred to a receiver. The method of producing an image product using the intermediate transfer surface includes the steps of applying an image to an intermediate image receiving surface wherein the image includes at least one barrier image, applying a clear toner on the at least one barrier image and then applying a second and/or additional images on the clear toner to form a plurality of inter-digitated images that can be transferred to a receiver.

The color of the barrier image toner will depend upon whether a stereoscopic image is being applied, in which case the barrier color should be opaque. Additionally, if color shifting is being performed using an opaque barrier (as illustrated in FIG. 1D), then the barrier image toner will be opaque; and if color shifting is being performed using a translucent or transparent barrier (as illustrated in FIG. 1E), then the barrier image toner can be any type of translucent or transparent color toner. In the latter case, the interaction between the color of the barrier image and the colors of the underlying should be considered to achieve a desired effect. For stereoscopic images the toner can be applied, for example, in the order of yellow, magenta, cyan, clear and black (YMCLK) or black, yellow, magenta, cyan, clear and black (KYMCLK). The barrier can be black, white, or any other color. One skilled in the art would understand that any number of colors used, such as a single color image, such as can be printed on the NexPress Digimatster, or multiple color images, such as can be printed using the NexPress 2100 or similar printers using an intermediate web. For color shifting images the toner can be applied, for example, in the order of black, yellow, magenta, clear and cyan (KYMLC) such that at viewing angles where cyan overlaps yellow the image has a more greenish tint and at viewing angles where cyan overlaps magenta the image has a more bluish tint. Color shifting images can also have toner applied, for example, in the order of black, yellow, cyan, clear and magenta (KYCLM) such that at viewing angles where magenta overlaps cyan the image will have a bluish tint and where magenta overlaps yellow the image will have a reddish tint.

Finally, the resultant image product is applied to a fuser in order to fuse the applied toner to the receiving member (step 255). Steps 220-255 can be performed using any type of processor in a printer, including an application specific integrated circuit (ASIC) and/or a field programmable gate array (FPGA).

The resulting image product can be any type of product, such as a multi-language packaging, warning labels, motion imaging in posters, children's books, compact disc (CD) or digital versatile disc (DVD) cases, trading cards, mouse pads, counter displays, key rings, framed pictures, bank checks, security documents, currency, and/or the like. The resulting image product can be backlit when, for example, the product is a poster.

Figure 2C:
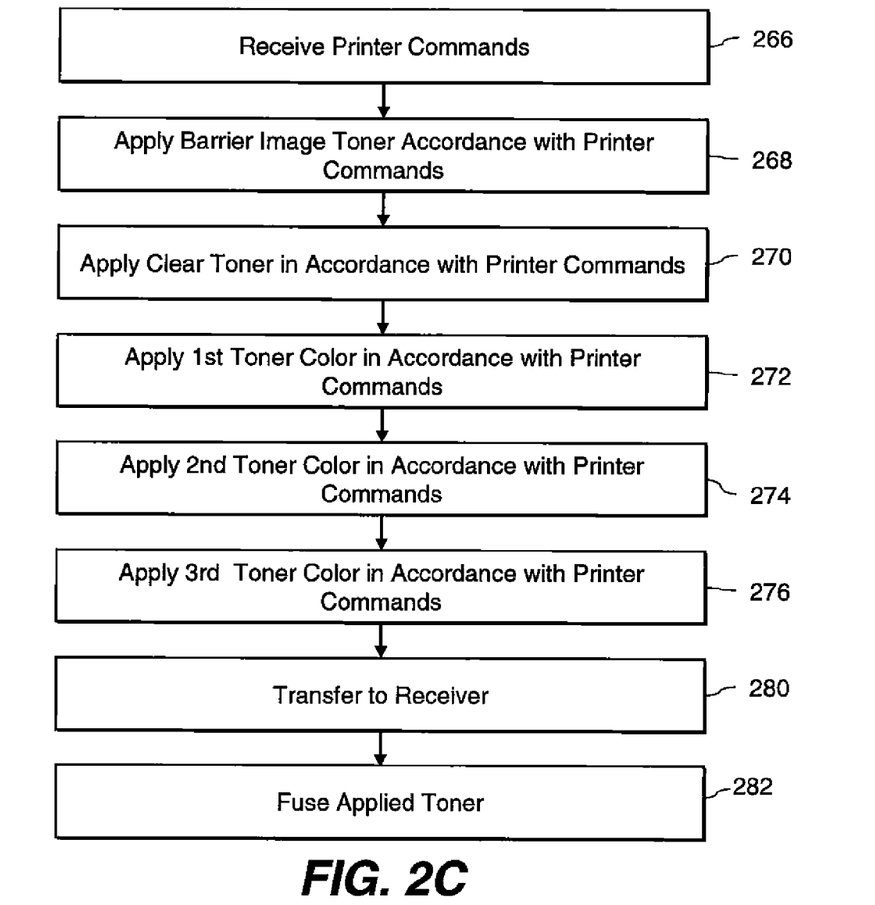
FIG. 2C is a flow chart illustrating another exemplary method in accordance with the present invention.

FIG. 2C is a flow chart illustrating another exemplary method in accordance with the present invention. Initially, image data is received and portions of the received image data that are to include barriers are identified. Image commands are then generated based on the received image data and an image product is printed based on the printer commands. Initially, the printing commands are received by the printer (step 266) and a barrier image toner is then applied to the intermediate transfer surface, such as a web as shown in FIG. 3, and then transferred to a receiver in accordance with the printer commands (step 268).

Next, a clear toner is applied to the receiver member in accordance with the printer commands (step 270) in registration with the previous images. Preferably, the clear toner can be applied such that portions including barriers have less clear toner than portions that do not include barriers. This provides a smooth surface to the resultant image product. This is also an additional security feature that makes images less easily modified. Finally additional color layers are successively applied to the intermediate receiving surface in accordance with the printer commands (steps 272-278), such as a first, second, third, and any additional toner colors before these layers are transferred to a receiver (step 280) and fused (step 282).

Figure 3:
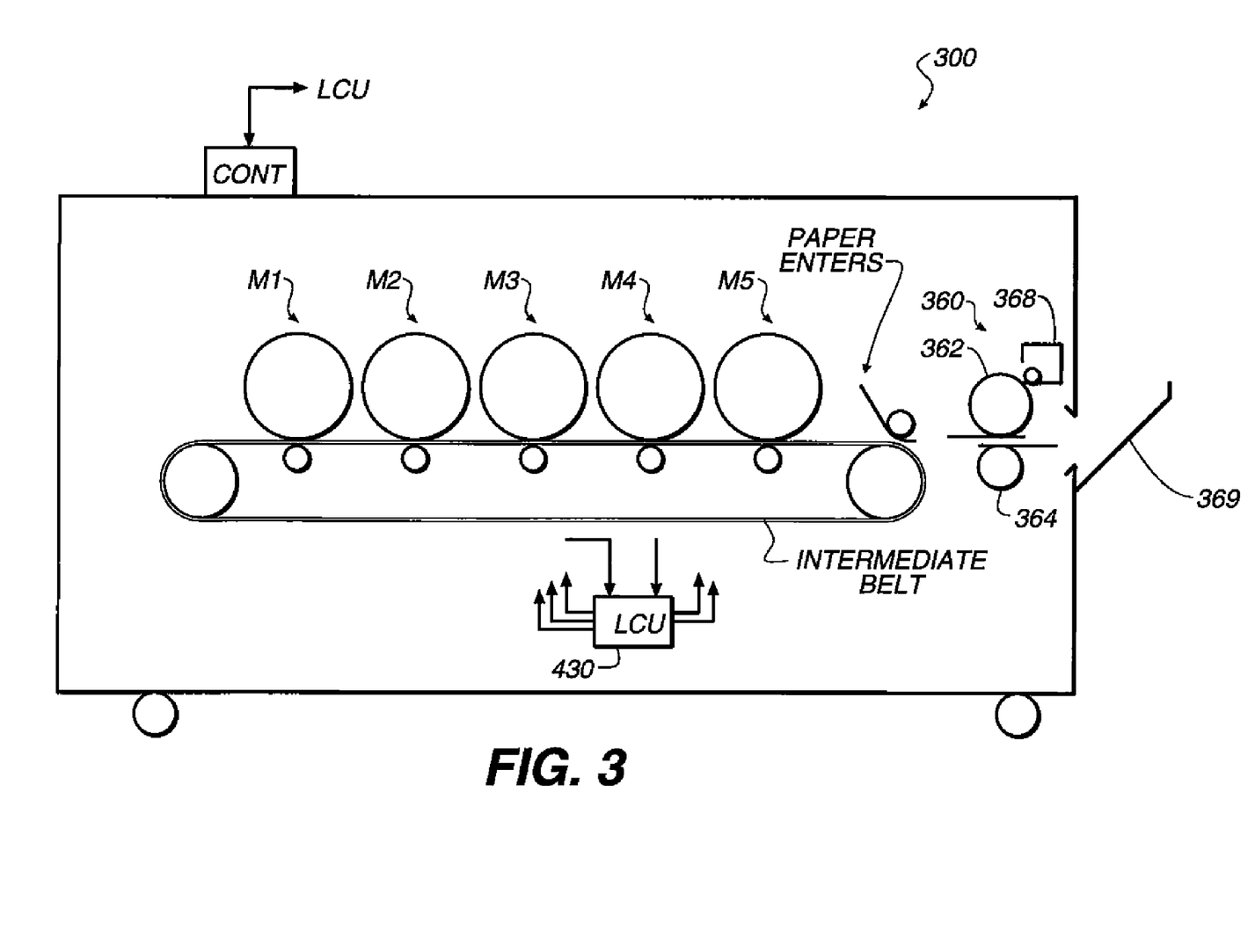
FIG. 3 is a schematic side elevational view, in cross section, of a typical electrographic reproduction apparatus suitable for use with this invention.
Figure 4:
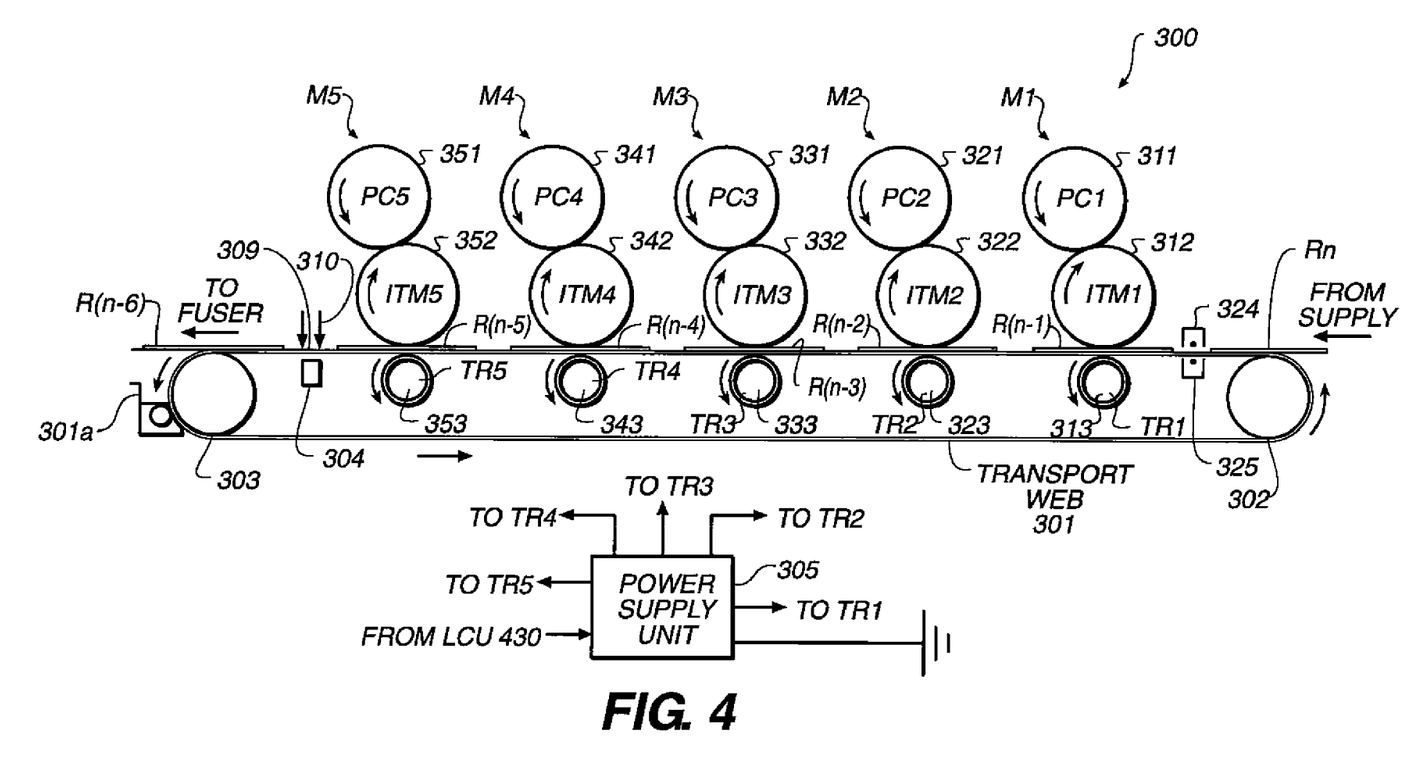
FIG. 4 is a schematic side elevational view, in cross section, of the reprographic image-producing portion of the electrographic reproduction apparatus of FIG. 3, on an enlarged scale.
Figure 5:
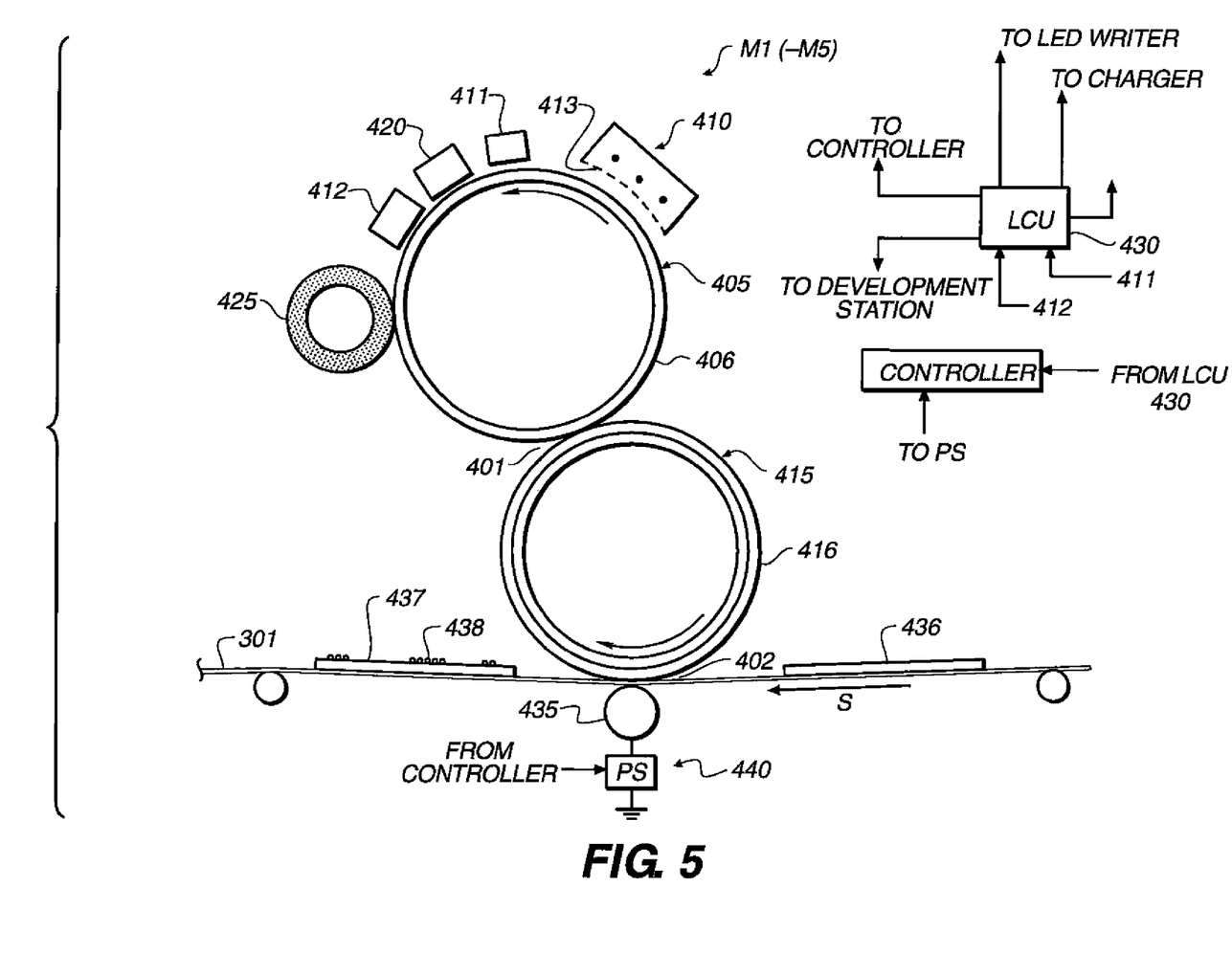
FIG. 5 is a schematic side elevational view, in cross section, of one printing module of the electrographic reproduction apparatus of FIG. 3, on an enlarged scale.

Now that a high level description of the invention has been provided, a more detailed description of the implementation in an electrostatic printer is presented in connection with FIGS. 3-5, which are side elevational views schematically showing portions of a typical electrographic print engine or printer apparatus suitable for printing of pentachrome images. Although one embodiment of the invention involves printing using an electrophotographic engine having three sets of single color image producing or printing stations or modules arranged in tandem, the invention contemplates that more or less than three colors may be combined on a single receiver member, or may include other typical electrographic writers or printer apparatus.

An electrographic printer apparatus 300 shows an electrophotograghic printer having an intermediate transfer surface that has a number of tandemly arranged electrostatographic image forming printing modules M1, M2, M3, M4, and M5. Each of the printing modules M1, M3, M4, and M5 generates a single-color toner image and printing module M2 includes a clear toner for transfer of clear images to a receiver member successively moved through the modules. Each receiver member, during a single pass through the five modules M1-M5, can have transferred in registration thereto up to four single-color toner images (which can form a CMYK process color image) and one clear toner image. As used herein the term process color implies that in an image formed on a receiver member combinations of subsets of the four colors are combined to form other colors on the receiver member at various locations on the receiver member, and that all four colors participate to form process colors in at least some of the subsets wherein each of the four colors may be combined with one or more of the other colors at a particular location on the receiver member to form a color different than the specific color toners combined at that location. In general, printing modules M1, M3, M4 and M5 can each form color separation images using any combination of colors, such as black (K), cyan (C), magenta (M), yellow (Y) and black (K); red (R), green (G) and blue (B); and/or the like. These colors can be arranged in any order. However, for printing barrier images on a 5 color printer, printing modules M3-M5 can be used to produce yellow (Y), magenta (M), and cyan (C) separations, module M2 can produce a clear toner layer, and module M1 can produce a barrier using black (K) or another color toner.

In another embodiment the printer has receiver members ($R_n$-$R_{(n-6)}$ as shown in FIG. 4) are delivered from a paper supply unit (not shown) and transported through the printing modules M1-M5. The receiver members are adhered (e.g., preferably electrostatically via coupled corona tack-down chargers 324, 325) to an endless transport web 301 entrained and driven about rollers 302, 303. Each of the printing modules M1-M5 similarly includes a photoconductive imaging roller, an intermediate transfer member roller, and a transfer backup roller. Thus in printing module M1, a first color toner separation image can be created on the photoconductive imaging roller PC1 (311), transferred to intermediate transfer member roller ITM1 (312), and transferred again to a receiver member moving through a transfer station, which transfer station includes ITM1 forming a pressure nip with a transfer backup roller TR1 (313). Similarly, printing modules M2, M3, M4, and M5 include, respectively: PC2, ITM2, TR2 (321, 322, 323); PC3, ITM3, TR3 (331, 332, 333); PC4, ITM4, TR4 (341, 342, 343); and PC5, ITM5, TR5 (351, 352, 353). A receiver member, $R_n$, arriving from the supply, is shown passing over roller 302 for subsequent entry into the transfer station of the first printing module, M1, in which the preceding receiver member $R_{(n-1)}$ is shown. Similarly, receiver members $R_{(n-2)}$, $R_{(n-3)}$, $R_{(n-4)}$, and $R_{(n-5)}$ are shown moving respectively through the transfer stations of printing modules M2, M3, M4, and M5. An unfused image formed on receiver member $R_{(n-6)}$ is moving as shown towards a fuser of any well known construction, such as the fuser assembly 360 (shown in FIG. 3).

A power supply unit 305 provides individual transfer currents to the transfer backup rollers TR1, TR2, TR3, TR4, and TR5 respectively. A logic and control unit 430 (FIG. 3) includes one or more computers and in response to signals from various sensors associated with the electrophotographic printer apparatus 300 provides timing and control signals to the respective components to provide control of the various components and process control parameters of the apparatus in accordance with well understood and known employments. A cleaning station 301a for transport web 301 is also typically provided to allow continued reuse thereof.

With reference to FIG. 5 wherein a representative printing module (e.g., M1 of M1-M5) is shown, each printing module of the electrographic printer apparatus 300 includes a plurality of electrographic imaging subsystems for producing a single color toned image or a clear image (in the case of M4). Included in each printing module is a primary charging subsystem 410 for uniformly electrostatically charging a surface 406 of a photoconductive imaging member (shown in the form of an imaging cylinder 405). An exposure subsystem 420 is provided for image-wise modulating the uniform electrostatic charge by exposing the photoconductive imaging member to form a latent electrostatic color separation image of the respective color. A development station subsystem 425 serves for toning the image-wise exposed photoconductive imaging member with toner of a respective color (or clear toner). An intermediate transfer member 415 is provided for transferring the respective color separation image (or clear toner separation image) from the photoconductive imaging member through a transfer nip 401 to the surface 416 of the intermediate transfer member 415 and from the intermediate transfer member 415 to a receiver member (receiver member 436 shown prior to entry into the transfer nip and receiver member 437 shown subsequent to transfer of the toned color or clear separation image) which receives the respective toned color separation images and the clear separation image in superposition to form a composite multicolor image and barrier image thereon.

Subsequent to transfer of the respective color separation images, overlaid in registration, one from each of the respective printing modules M1-M5, the receiver member is advanced to a fusing assembly to fuse the multicolor and clear toner image to the receiver member. Additional necessary components provided for control may be assembled about the various process elements of the respective printing modules (e.g., a meter 411 for measuring the uniform electrostatic charge, a meter 412 for measuring the post-exposure surface potential within a patch area of a patch latent image formed from time to time in a non-image area on surface 406, etc). Further details regarding the electrographic printer apparatus 300 are provided in U.S. Publication No. 2006/0133870, published on Jun. 22, 2006, in the name of Yee S. Ng et al and of the printing process provided in U.S. Publication No. 2008/0159786, published on Jul. 3, 2008 in the name of Thomas Tombs et al. each of which are hereby incorporated by reference. One preferred method of rendering an image in conjunction with these embodiments is to use a continuous toned image of variable density as described in TechnologE Watch Vol. 11 Fall 2006.

Associated with the printing modules 400 is a main printer apparatus logic and control unit (LCU) 430, which receives input signals from the various sensors associated with the printer apparatus and sends control signals to the chargers 410, the exposure subsystem 420 (e.g., LED writers), and the development stations 425 of the printing modules M1-M5. Each printing module may also have its own respective controller coupled to the printer apparatus main LCU 430.

Subsequent to the transfer of the three color toner separation images and two clear toner separation images in superposed relationship to each receiver member, the receiver member is then serially de-tacked from transport web 301 and sent in a direction to the fusing assembly 360 to fuse or fix the dry toner images to the receiver member. The transport web is then reconditioned for reuse by cleaning and providing charge to both surfaces 324, 325 (see FIG. 4) which neutralizes charge on the opposed surfaces of the transport web 301.

The electrostatic image is developed by application of pigmented (or non-pigmented) marking particles (toner) to the latent image bearing photoconductive drum by the respective development station 425. Each of the development stations of the respective printing modules M1-M5 is electrically biased by a suitable respective voltage to develop the respective latent image, which voltage may be supplied by a power supply or by individual power supplies (not illustrated). Preferably, the respective developer is a two-component developer that includes toner marking particles and magnetic carrier particles. The toner marking particles can be, for example, polyester based. Each color development station has a particular color of pigmented toner marking particles associated respectively therewith for toning or a clear toner (i.e., non-pigmented) respectively associated therewith. Thus, each of the five modules creates a different color marking particle image or a clear toner image on the respective photoconductive drum.

With further reference to FIG. 3, transport belt 301 transports the toner image carrying receiver members to a fusing or fixing assembly 360, which fixes the toner particles to the respective receiver members by the application of heat and pressure. More particularly, fusing assembly 360 includes a heated fusing roller 362 and an opposing pressure roller 364 that form a fusing nip therebetween. Fusing assembly 360 also includes a release fluid application substation generally designated 368 that applies release fluid, such as, for example, silicone oil, to fusing roller 362. The receiver members carrying the fused image are transported seriatim from the fusing assembly 360 along a path to either a remote output tray, or are returned to the image forming apparatus to create an image on the backside of the receiver member (form a duplex print).

The logic and control unit (LCU) 430 includes a microprocessor incorporating suitable look-up tables and control software, which is executable by the LCU 430. The control software is preferably stored in memory associated with the LCU 430. Sensors associated with the fusing assembly provide appropriate signals to the LCU 430. In response to the sensors, the LCU 430 issues command and control signals that adjust the heat and/or pressure within fusing nip 366 and otherwise generally nominalizes and/or optimizes the operating parameters of fusing assembly 360 for imaging substrates.

Image data for writing by the printer apparatus 300 may be processed by a raster image processor (RIP), which may include a color separation screen generator or generators. The output of the RIP may be stored in frame or line buffers for transmission of the color separation print data to each of respective LED writers. The RIP and/or color separation screen generator may be a part of the printer apparatus or remote therefrom. Image data processed by the RIP may be obtained from a color document scanner or a digital camera or generated by a computer or from a memory or network which typically includes image data representing a continuous image that needs to be reprocessed into halftone image data in order to be adequately represented by the printer. The RIP may perform image processing processes including color correction, etc. in order to obtain the desired color print. Color image data is separated into the respective colors and can be converted by the RIP to halftone dot image data in the respective color using matrices, which comprise desired screen angles and screen rulings. The RIP may be a suitably programmed computer and/or logic devices and is adapted to employ stored or generated matrices and templates for processing separated color image data into rendered image data in the form of halftone information suitable for printing. Portions of the image can also be printed as continuous tone images of variable density.

The invention has been described in detail with particular reference to certain preferred embodiments thereof, but it will be understood that variations and modifications can be effected within the spirit and scope of the invention.

What is claimed is:

1. A method of producing an image product, the method comprising:
    applying a first image comprising a first toner to an intermediate image receiving surface wherein said image comprises at least one barrier image;
    applying a clear toner on the at least one barrier image; and
    applying a second image on the clear toner to form a plurality of interdigitated images that can be transferred to a receiver, wherein a depth of the clear toner is thinner in portions that are applied on the first toner than portions that are not applied on the first toner.

2. The method of claim 1, wherein the first image forms a plurality of barriers that are arranged to produce a stereoscopic image.

3. The method of claim 1, wherein the first toner is black.

4. The method of claim 1, wherein the clear toner is transparent or translucent.

5. The method of claim 1, further comprising a motion image containing two interdigitated images such that a viewing angle change necessary to obscure one image and allow the other image to be viewed is determined by the arctangent of the ratio of the width of the at least one barrier image, which is at least one pixel, to the thickness of the clear layer.

6. A method of producing an image product, the method comprising:
    applying a first image comprising a first toner to an intermediate image receiving surface wherein said image comprises at least one barrier image;
    applying a clear toner on the at least one barrier image; and
    applying a second image on the clear toner to form a plurality of interdigitated images that can be transferred to a receiver, wherein the first toner is transparent, translucent is opaque, is a color other than black and depending on a viewing angle, the at least one barrier image shifts viewed color of the second image after transfer onto a receiver.

7. The method of claim 6, wherein the first image is applied to a first portion of the clear toner, the method further comprising:
applying a second image to a second portion of the image receiving surface.

8. The method of claim 6, wherein the second image is comprised of three colors and the second image is comprised of four colors, including a color of the second toner.

9. A method of producing an image product, the method comprising:
receiving printer commands, and in response to the printer commands the method comprises
controlling a first print module to apply a base image comprising a first toner to an intermediate image receiving surface wherein said image comprises at least one barrier image;
controlling a second print module to apply a clear toner on the base image; and
controlling a third print module to apply a second image comprising a second toner on the clear toner to form a plurality of interdigitated images that can be transferred to a receiver, wherein a depth of the clear toner is thinner in portions that are applied on the first toner than portions that are not applied on the first toner.

10. The method of claim 9, wherein the first image forms a plurality of barriers that are arranged to produce a stereoscopic image.

11. The method of claim 9, wherein the first toner is black.

12. The method of claim 9, wherein the clear toner is transparent or translucent.

13. The method of claim 9, wherein the second image is applied by sequential application of three different color toners.

14. The method of claim 9, wherein the second image is a motion image containing two interdigitated images such that a viewing angle change necessary to obscure one image and allow the other image to be viewed is determined by the arctangent of the ratio of the width of the at least one barrier image, which is at least one pixel, to the thickness of the clear layer.

15. The method of claim 9, wherein one of the interdigitated images is comprised of three colors and another one of the interdigitated images is comprised of four colors.

16. A method of producing an image product, the method comprising:
applying a first image comprising a first toner to an intermediate receiving surface wherein said first image comprises applying at least one barrier image to said intermediate receiving surface;
applying a clear toner on the first image; and
applying a second toner on the clear toner to form at least one image that can be transferred to a receiver, wherein a depth of the clear toner is thinner in portions that are applied on the first toner than portions that are not applied on the first toner.

* * * * *